(12) United States Patent
Luethi et al.

(10) Patent No.: US 8,305,563 B2
(45) Date of Patent: Nov. 6, 2012

(54) ELECTRO-OPTICAL DISTANCE-MEASURING UNIT

(75) Inventors: Thomas Luethi, Winterthur (CH); Dietrich Meier, Niedererlinsbach (CH)

(73) Assignee: Leica Geosystems AG, Unterentfelden (CH)

( * ) Notice: Subject to any disclaimer, the term of this patent is extended or adjusted under 35 U.S.C. 154(b) by 171 days.

(21) Appl. No.: 12/918,193

(22) PCT Filed: Feb. 10, 2009

(86) PCT No.: PCT/CH2009/000055
§ 371 (c)(1),
(2), (4) Date: Aug. 18, 2010

(87) PCT Pub. No.: WO2009/103172
PCT Pub. Date: Aug. 27, 2009

(65) Prior Publication Data
US 2010/0315619 A1   Dec. 16, 2010

(30) Foreign Application Priority Data
Feb. 19, 2008   (CH) ........................................ 0230/08

(51) Int. Cl.
*G01C 3/08*   (2006.01)
(52) U.S. Cl. ........................ 356/5.09; 356/5.01; 356/5.1
(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 5,764,360 A * | 6/1998 | Meier | 356/486 |
| 6,876,441 B2 * | 4/2005 | Barker | 356/5.09 |
| 2007/0013917 A1 * | 1/2007 | Stubbe et al. | 356/511 |
| 2009/0033945 A1 | 2/2009 | Meier | |

FOREIGN PATENT DOCUMENTS

| | | |
|---|---|---|
| DE | 195 42 490 | 6/1997 |
| EP | 1 647 838 | 4/2006 |
| EP | 1 744 119 | 1/2007 |
| WO | 97/18486 | 5/1997 |
| WO | 02/084327 | 10/2002 |

* cited by examiner

*Primary Examiner* — Luke Ratcliffe
(74) *Attorney, Agent, or Firm* — Rankin, Hill & Clark LLP

(57) ABSTRACT

An electro-optical distance-measuring unit (10) includes a light source (1), the emitted light of which in the distance-measuring unit (10) is guided onto a measurement path (8) at least by one polarizing beam splitter (3), an electro-optical modulator (5) and a retarder (6). Light that is returned along the measurement path (8) is guided at least by the retarder (6), the electro-optical modulator (5) and the polarizing beam splitter (3) onto a detector (4). The distance-measuring unit (10) furthermore includes a control and evaluation unit (11) for determining a length of the measurement path (8) in accordance with a modulation frequency of the electro-optical modulator (5) and a signal of the detector (4). The light source (1) has a broad spectrum of the emitted light and is preferably a super-luminescent diode.

11 Claims, 1 Drawing Sheet

ELECTRO-OPTICAL DISTANCE-MEASURING UNIT

BACKGROUND OF THE INVENTION

1. Field of the Invention

The invention relates to the field of electro-optical distance-measurement, in particular to an to an electro-optical distance-measuring unit.

2. Description of Related Art

Such electro-optical distance-measurement is known from EP-A-1 647 838, for example. The content of said application in its entirely is incorporated for elucidating the functioning of the Fizeau method for absolute distance measurement. What is of importance for the present invention is that, in this method, outgoing and returning measurement light is modulated in a modulator. The measurement light is generated by a laser, in particular a diode laser. By variation of the frequency of said modulation, a minimum of the intensity of a detected measurement light beam is determined (or, substantially synonymously, a zero crossing of the derivative of the intensity). The length of a measurement path between the measuring device and a retroreflector is determined from the minimum frequency. It is found that an additional polarization by optical elements in the measurement light beam shifts the position of said minimum as a second-order aberration. As a result, the measurement is disturbed, and compensation measures have to be implemented. The disturbance of the polarization can be caused, for example, by additional beam deflecting mirrors in the measurement beam or the retroreflector.

WO 97/18486 discloses an electro-optical absolute distance measurement according to the Fizeau method. In that case, a laser beam is generated, and guided by a focusing optical unit and an optical isolator onto a polarizing beam splitter for linearly polarizing the laser light, and is subsequently guided onto a measurement path by an electro-optical modulator, a further electro-optical crystal for eliminating the influence of an external additional polarization, and a lambda/4 retarder and an exit optical unit. Light returning along the measurement path passes through the elements mentioned as far as the polarizing beam splitter and is guided onto a detector by the latter. An evaluation unit serves for determining the length of the measurement path on the basis of the detector signal.

EP 1 744 119 describes an apparatus for optical coherence tomography. This uses light that sweeps over an optical frequency range. The light is generated by a broadband source, for example an "edge-emitting LED (ELED)" or a superluminescent diode (SLD) or a "fiber fluorescent source (ED-FFS)". The light from the source is filtered by, for example, a Fabry-Perot filter or an acousto-optical filter, such that it sweeps over a predefined frequency range with a selected frequency line. The rest of the light from the broadband source is therefore filtered out.

BRIEF SUMMARY OF THE INVENTION

Therefore, it is an object of the invention to provide an electro-optical distance measurement of the type mentioned in the introduction which eliminates the disadvantages mentioned above.

A corresponding electro-optical distance-measuring unit, therefore, comprises a light source, the emitted light of which in the distance-measuring unit is guided onto a measurement path at least by a polarizing beam splitter, an electro-optical modulator and a lambda/4 retarder, (for temperature compensation of the modulator refraction coefficient). Light returning, that is to say reflected, along the measurement path is guided onto a detector at least by the retarder, the electro-optical modulator and the polarizing beam splitter. Furthermore, the distance-measuring unit comprises an evaluation unit for determining a length of the measurement path in accordance with a modulation frequency of the electro-optical modulator and a signal of the detector. The light source has a broad spectrum of the emitted light. Preferably, the light source is a superluminescent diode (SLD or SLED). A further advantage, when using a superluminescent diode instead of a laser source, is that there is no need for an optical isolator in front of the light source, said isolator being intended to prevent returning light from penetrating into the laser and exciting the latter to emission. An optical isolator is an optical component which transmits light waves having a specific polarization direction only in one (transmission) direction, but absorbs light of arbitrary polarization in the opposite direction (blocking direction).

The invention, with the use of a broadband source, is at odds with conventional constructions for electro-optical distance measurement, in which narrowband (laser) light sources having a precisely controlled wavelength are used in a targeted manner in order to obtain high measurement accuracies. Surprisingly, it is found, as will be explained further below, that deviations that arise as a result of the broadband measurement light mutually compensate for one another.

The electro-optical modulator preferably modulates the polarization of the light. In principle, it is also possible to use a modulator which—as in the original Fizeau method—modulates the amplitude; in practice, however, this is susceptible to disturbances.

The detector signal preferably corresponds to the intensity of the returned signal that has been subjected to inverse modulation by the modulator. The modulation frequency of the electro-optical modulator lies in the radiofrequency range, i.e. for example in a range of 2 GHz to 2.5 GHz.

Surprisingly, it is found that, in the case of a broadband light source, the frequency position of a minimum of a detector signal in the case of varying modulation frequency is no longer influenced (at least not to a significant extent) by disturbances of the polarization of the measurement light. As a result, compensation devices that are necessary when the distance-measuring unit is operated with a laser diode, as has been customary heretofore, are no longer required. The construction of the distance-measuring unit is simplified.

The minimum bandwidth of the light source is preferably determined by the following relationship with modulator parameters:

$$\left| \frac{d\{[n_o(\lambda) - n_e(\lambda)] l_{crystal}/\lambda\}}{d\lambda} \Delta\lambda \right| \geq 1$$

In this case, $n_o$ is the ordinary and $n_e$ the extraordinary wavelength-dependent refractive index of the birefringent modulator material, $l_{crystal}$ is the length of the crystal, $\lambda$ is the wavelength and $\Delta\lambda$ is the bandwidth. A minimum value for $\Delta\lambda$ thus results from this condition.

The frequency of the light source can be chosen substantially as desired, such that different types of superluminescent diode can be used (e.g. having a wavelength of 650, 750, 795, 800, 830, 840, 850, 1270, 1300, 1400, 1480 or 1550 nm).

In one preferred embodiment of the invention the frequency and bandwidth of the light can be stabilized by an optical bandpass filter arranged in the beam path. In this case, the bandwidth of the filter is preferably at least somewhat larger than the minimum required bandwidth of the source as determined above, for example at 20% larger.

Further preferred embodiments emerge from the dependent patent claims.

BRIEF DESCRIPTION OF THE DRAWINGS

The subject matter of the invention will be explained in greater detail below on the basis of preferred exemplary embodiments illustrated in the accompanying drawings, in which, in each case schematically.

The reference symbols used in the drawings and their meanings are summarized in the List of reference symbols. In principle, identical parts are provided with identical reference symbols in the figures.

DETAILED DESCRIPTION OF THE INVENTION

Figure 1:
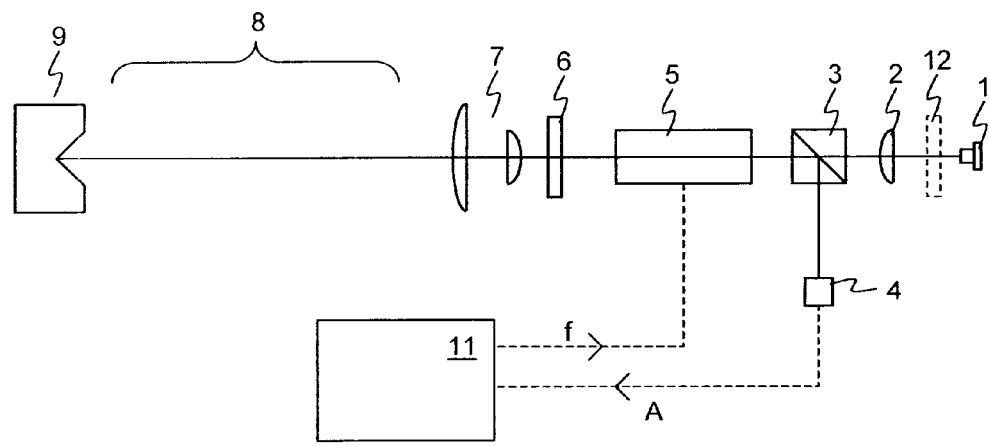
FIG. 1 shows a structure of a Fizeau distance-measuring unit.

FIG. 1 shows a structure of a Fizeau distance-measuring unit for absolute distance measurement: A light source 1 emits measurement light, which is guided onto a measurement path 8 by a collimator 2, a polarizing beam splitter 3, an electro-optical modulator 5, a retarder or retarder plate 6 and a beam expander 7. The measurement path 8 typically has a length of a few meters to hundreds of meters, if appropriate even a few kilometers. At the end of the measurement path 8, a reflector, typically a cube corner retroreflector or triple reflector 9, reflects the measurement light. The latter passes as returning measurement light through the beam expander 7, the retarder plate 6, the electro-optical modulator 5 and the polarizing beam splitter 3 onto a detector 4. The electro-optical modulator 5 preferably modulates the polarization of the outgoing and also of the returning measurement light. For this purpose, it has a device for driving the modulator 5 with a high-frequency modulation frequency. The retarder plate 6 is a lambda/4 plate and thus generates from linearly polarized light circularly polarized light, and after double passage linearly polarized light again, but with a polarization direction rotated by 90°, that is to say with interchanged axes of the modulation in the modulation crystal. The detector 4 measures the intensity of the returning light. An evaluation unit 11 processes an output signal of said detector 4, controls the modulation frequency of the electro-optical modulator 5 for iteratively determining a minimum of the detector signal and carries out the distance determination according to the Fizeau method. Further, generally known elements of such a distance-measuring unit such as filters, polarizers, mirrors, etc. can be present, but are not depicted for the sake of clarity.

For the functioning of the absolute distance measurement according to the Fizeau method, reference is made to EP-A-1 647 838 cited in the introduction.

In one preferred embodiment of the invention, an optical bandpass filter 12 is additionally present. Said filter is depicted by dashed lines in FIG. 1, by way of example directly in front of the light source 1. However, the bandpass filter 12 can also be arranged at any other location in the beam path between light source 1 and detector 4. The bandpass filter 12 limits the spectrum of the light passing through in accordance with the modulation material used in the optical modulator 5 and stabilizes, in particular, the wavelength of the transmitted light.

Figure 2:
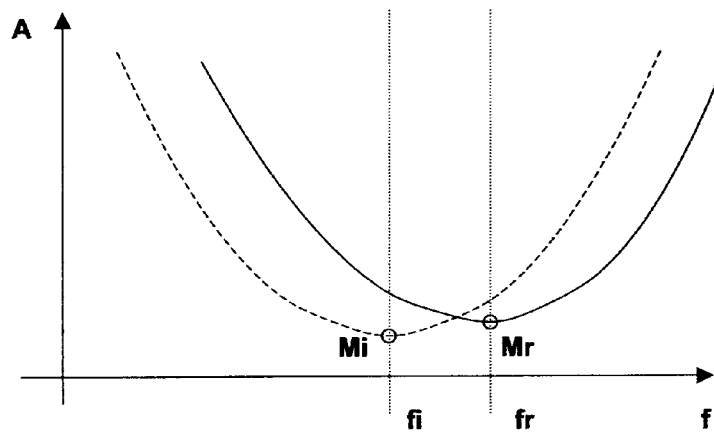
FIG. 2 shows characteristic profiles of the dependence between modulation frequency and detector signal in accordance with the prior art.

FIG. 2 shows characteristic profiles of the dependence between modulation frequency f and the amplitude A of the detector signal in accordance with the prior art. The figure shows one of the minima of the profile of A against f. The dashed line shows the ideal profile without disturbance of the polarization, and the solid line shows the profile with disturbances of the polarization. The disturbances of the polarization reside in the fact that, in at least one component of the distance-measuring unit 10 or of the retroreflector 9, the light, depending on its wavelength and/or the orientation of its polarization upon passing through the component, is additionally polarized, i.e. altered in polarization ("excess polarization").

The polarization modulation can be regarded as modulation of the phase of two mutually perpendicular light vector components. It is, thus, possible to additionally shift the phase between the polarization directions such that, for example linearly polarized light becomes circularly polarized. Such disturbing components are, in particular, deflection mirrors (not depicted) and retroreflector 9. In the case of the electro-optical modulator 5, such disturbances bring about a shift in the minimum frequency, particularly when the electro-optical modulator 5 is not optimally tuned ("non-flat" modulator operated at resonance), that is to say when its electrical excitation frequency and its resonant frequency do not match. In the case of the retroreflector 9, which is normally embodied as a triple mirror (cube corner mirror), the influence of the polarization changes by virtue of the retroreflector 9 being rotated and tilted with respect to measurement beam 8. As a consequence, as far as the measurement by the detector 4 is concerned, this brings about a shift in the minimum from an ideal minimum Mi (at a frequency fi) to a disturbed minimum Mr. The disturbed minimum Mr corresponds to a different frequency fr and thus also a different corrupted, measured distance with respect to the retroreflector 9.

Figure 3:
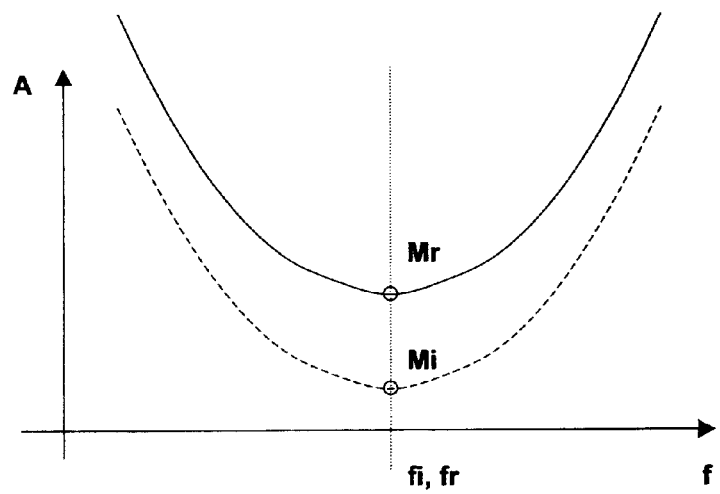
FIG. 3 shows characteristic profiles of the dependence between modulation frequency and detector signal in accordance with the invention.

FIG. 3 shows characteristic profiles of the dependence between modulation frequency and detector signal in accordance with the invention. The dashed line shows the ideal profile without disturbances of the polarization, and the solid line shows the profile with disturbances of the polarization. It is evident that, in the case of a narrow bandwidth of the light source 1, the amplitude of the DC signal component (DC component) is dependent on the modulation frequency and the temperature of the modulation crystal. In the case of the broadband source, however, the DC components rise in an averaged fashion over the wavelengths and, consequently, the frequency at which the minimum Mr occurs remains unchanged! This advantageous effect makes it possible to dispense with metrological compensation measures for correcting the disturbed minimum.

The light source 1 is preferably a superluminescent diode, or some other light source, having a specific bandwidth of the emitted light. When LiTaO3 is used as modulation material in the electro-optical modulator 5, the bandwidth should be at least ten nanometers, preferably at least fifteen nanometers. A bandwidth of 30 to 40 nanometers gives good results. When LiNbO3 is used as modulation material, the bandwidth should be at least five to ten nanometers in order that the advantageous effect described occurs. These bandwidths preferably hold true for a light wavelength of 795 nanometers. If the optional bandpass filter 12 is present, then it limits the light passing through at most to such a bandwidth corresponding to the modulation material used. The filter bandwidth is therefore at least as wide as, and with a better result somewhat wider than, the required bandwidth of the light source (since here in general a filter limits the bandwidth more sharply than a source).

The light source 1 preferably has a small luminous area and a high intensity of the emitted light. The luminous area of the light source 1 is for this purpose preferably less than 10 square micrometers, in particular less than 4 square micrometers. The intensity of the emitted light is generally limited by regulations concerning eye safety, taking account of transmission losses in the beam path and temperature influences. As a result, the intensity or the power emitted by the light source in the form of light is typically three to five milliwatts.

LIST OF REFERENCE SYMBOLS

| | LIST OF REFERENCE SYMBOLS | | |
|---|---|---|---|
| 1 | light source | 8 | measurement path |
| 2 | collimator | 9 | retroreflector |
| 3 | polarizing beam splitter | 10 | distance-measuring unit |
| 4 | detector | 11 | control and evaluation unit |
| 5 | electro-optical modulator | 12 | bandpass filter |
| 6 | lambda/4 retarder | Mi | ideal minimum |
| 7 | beam expander | Mr | real minimum |

The invention claimed is:

1. An electro-optical distance-measuring unit, comprising:
a light source, the emitted light of which in the distance-measuring unit is guided onto a measurement path at least by a polarizing beam splitter, an electro-optical modulator and a lambda/4 retarder, and light returning along the measurement path is guided onto a detector at least by the retarder, the electro-optical modulator and the polarizing beam splitter, and
an evaluation unit for determining a length of the measurement path in accordance with a modulation frequency of the electro-optical modulator and a signal of the detector,
wherein the light source has a broad spectrum of the emitted light, and
wherein a bandwidth $\Delta\lambda$ of the light source satisfies the following condition $$\left| \frac{d\{[n_o(\lambda) - n_e(\lambda)] I_{crystal} / \lambda\}}{d\lambda} \Delta\lambda \right| \geq 1$$

where $n_o$ is the ordinary and $n_e$ the extraordinary wavelength-dependent refractive index of the modulator material, $I_{crystal}$ is the length of the modulator crystal and $\lambda$ is the wavelength of the light source.

2. The distance-measuring unit as claimed in claim 1, wherein the evaluation unit is designed for measuring the length of the measurement path according to the Fizeau method.

3. The distance-measuring unit as claimed in claim 1, wherein the electro-optical modulator is provided for modulating the polarization of the light passing through.

4. The distance-measuring unit as claimed in claim 1, wherein the light source has a small luminous area and a high intensity of the emitted light.

5. The distance-measuring unit as claimed in claim 1, wherein the luminous area of the light source is less than 10 square micrometers.

6. The distance-measuring unit as claimed in claim 1, wherein the intensity of the light emitted by the light source is between three and five milliwatts.

7. The distance-measuring unit as claimed in claim 1, wherein the modulation material is $LiTaO_3$ and the spectrum of the emitted light has a bandwidth of at least 10 nanometers.

8. The distance-measuring unit as claimed in claim 1, wherein the modulation material is $LiNbO_3$ and the spectrum of the emitted light has a bandwidth of at least 5 nanometers.

9. The distance-measuring unit as claimed in claim 1, wherein the light source is a superluminescent diode.

10. The distance-measuring unit as claimed in claim 1, wherein no optical isolator is arranged in the beam path in front of the light source.

11. The distance-measuring unit as claimed in claim 1, wherein an optical bandpass filter for stabilizing the frequency and the bandwidth is arranged in the beam path.

* * * * *